United States Patent [19]

Becker et al.

[11] Patent Number: 4,900,121

[45] Date of Patent: Feb. 13, 1990

[54] METHOD FOR ESTABLISHING A CONNECTION BETWEEN TWO OPTICAL LINES AND A DEVICE FOR IMPLEMENTATION OF THIS METHOD

[75] Inventors: Johann A. Becker, Overath; Werner V. Zell, Cologne, both of Fed. Rep. of Germany

[73] Assignee: U.S. Philips Corp., New York, N.Y.

[21] Appl. No.: 311,365

[22] Filed: Feb. 13, 1989

Related U.S. Application Data

[63] Continuation of Ser. No. 902,738, Sep. 2, 1986, abandoned.

[30] Foreign Application Priority Data

Sep. 11, 1985 [DE] Fed. Rep. of Germany ....... 3532312

[51] Int. Cl.[4] .................................................. G02B 6/36
[52] U.S. Cl. ............................... 350/96.20; 350/96.21
[58] Field of Search ................. 350/96.20, 96.21, 96.22

[56] References Cited

U.S. PATENT DOCUMENTS

| 4,332,435 | 6/1982 | Post | 350/96.20 |
| 4,359,262 | 11/1982 | Dolan | 350/96.22 X |
| 4,765,708 | 8/1988 | Becker et al. | 350/96.21 |

FOREIGN PATENT DOCUMENTS

| 0043570 | 1/1982 | European Pat. Off. | 350/96.20 |
| 3118173 | 7/1982 | Fed. Rep. of Germany. | |
| 3248003 | 6/1984 | Fed. Rep. of Germany | 350/96.20 |
| 2561002 | 9/1985 | France. | |
| 2573877 | 5/1986 | France. | |
| 0202407 | 10/1985 | Japan | 350/96.20 |

Primary Examiner—John D. Lee
Assistant Examiner—Phan T. Heartney
Attorney, Agent, or Firm—William L. Botjer

[57] ABSTRACT

The invention relates to a method for establishing a connection between two optical lines, in which a spare length of light conducting fibre is withdrawn from a storage container and, after completion of the connections, pushed back in again. To reduce the space required for storage containers, it is proposed that the light conducting fibres of the optical lines to be connected should each be connected to an end of a connecting fibre which is withdrawn as needed from a single storage container and whose excess lengths are slid back into the storage container after the connections have been made.

6 Claims, 2 Drawing Sheets

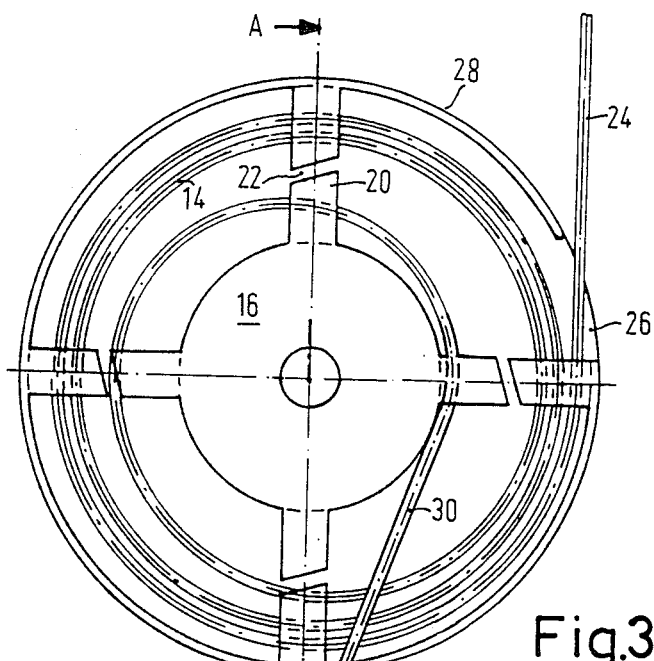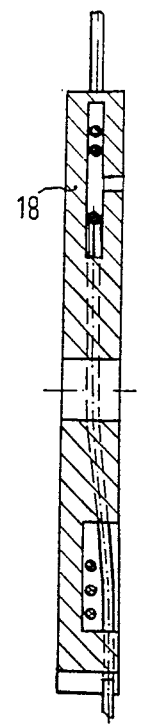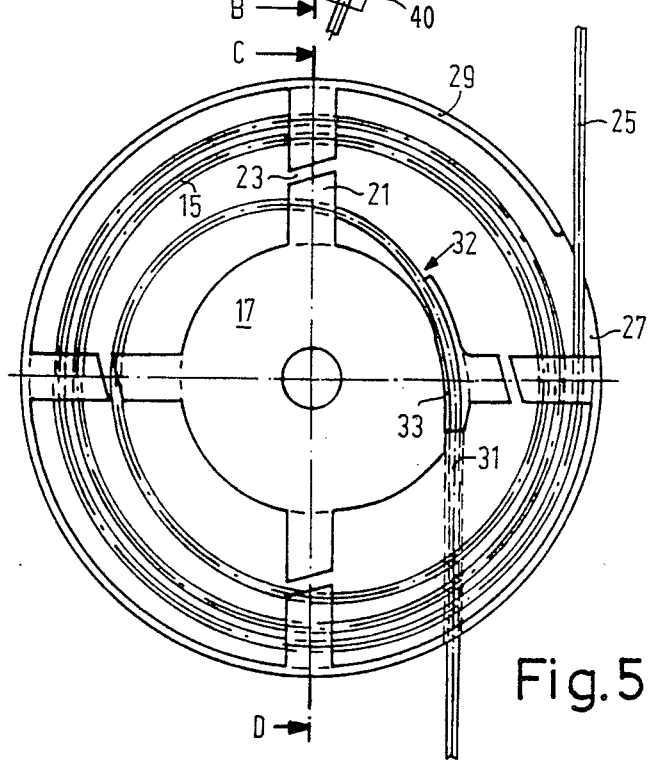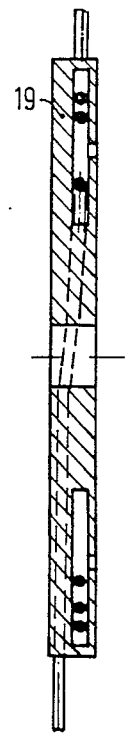

METHOD FOR ESTABLISHING A CONNECTION BETWEEN TWO OPTICAL LINES AND A DEVICE FOR IMPLEMENTATION OF THIS METHOD

This is a continuation of application Ser. No. 902,738, filed Sept. 2, 1986 (abandoned).

BACKGROUND OF THE INVENTION

This invention relates to a method for establishing a connection between two optical lines, in which a spare length of a light conducting fibre is pulled from a storage container and, pushed back in after establishment of the connections and also to a device for implementation of this method.

In a method of this kind known from DE-OS 31 18 173 the individual light conducting fibres of each cable and are each housed in storage containers from which spare lengths are drawn out for the direct connection of pairs of fibre ends and are pushed back in again after completion of the splices. This necessitates a considerable number of storage containers, namely twice as many as the number of fibres in the optical cables. This number of storage containers has also to be provided even if at first only some of the fibres are to be spliced together.

Furthermore, there is the problem, particularly at main distributors, that fibres of two or more incoming optical cables have to be connectable to each other as desired. Each of the storage containers has to contain spare lengths for the maximum distance to be bridged. The correspondingly large dimensions of the storage containers and their large number mean that a great deal of space has to be provided in a distributor housing.

SUMMARY OF THE INVENTION

It is an object of the invention to provide a process of the kind referred to, in which the space required for the storage containers is reduced.

To achieve this object the method according to the invention is characterized in that light conducting fibres of the optical lines to be connected are each connected to an end of a connecting fibre which is pulled out, as needed, from a single storage container and whose excess lengths are slid back into the storage container after completion of the connections.

With the method according to the invention only as many storage containers are required as there are in fact connections which have to be made. Even if all possible connections are made, the maximum number is only half as great as in the known case. Moreover, not all storage containers have to be dimensioned for the maximum spare lengths required. If only small distances have to be bridged, storage containers with reduced dimensions can be used.

A storage container of flat construction which is particularly suitable for the method according to the invention is characterized in that it comprises an essentially cylindrical core with a diameter of at least 40 mm, arranged centrally between two lateral guide walls, the distance h between the guide walls being in the range $d < h < 1.3\,d$, where d is the diameter of the connecting fibre being wound spirally in at least two turns in a plane around the core, the end of the outermost turn being led through an opening in a side wall surrounding the core at a distance and the end of the innermost turn being led obliquely from the winding space between the lateral guide walls and over the turns to a guide eyelet located radially outside the winding space. It is an advantage in this container if the end of the innermost turn is led, on its path to a point at least approximately in contact with the outer surface of the core, through a guide duct in an area outside the winding space.

A preferred embodiment is characterized in that, at least over a predetermined angular range, in which it is substantially concentric with the core, the guide duct runs obliquely with respect to the guidewalls, while the guide duct is led over the turns outside the space occupied by the turns in a plane that is parallel to and preferably between the guide walls.

Simple insertion of the turns is made possible if at least one of the lateral guide walls consist of at least three tangentially spaced spoke-shaped radial beams that are preferably interrupted in their central area by lead-in slots running obliquely to the tangent of the turns.

Pushing-in and pulling-out of the ends of the shunting circuit is made easy if both ends are pulled out or inserted simultaneously and evenly. If the available length of an end is not sufficient, while too much length is available for the other end, it is an advantage to be able to pull out one end and, at the same time or alternately, push the other end into the storage container in small sections.

Effective utilisation of the storage space in a storage container is achieved if the number n of turns is $$n = k \cdot \frac{D - d}{d_o},$$

where $0.2 < k < 0.3$, preferably with $k = 0.25$, $D =$ the diameter of the outermost turn, $d =$ the diameter of the core and $d_o =$ the diameter of the connecting fibre.

BRIEF DESCRIPTION OF THE DRAWING

The invention will be explained in detail by describing preferred examples of embodiment shown in the drawings.

FIG. 3 shows a top view of a first embodiment of a storage container suitable for the invention, FIG. 4 shows a cross-section through the container shown in FIG. 3 along the line A—B, FIG. 5 shows a top view of a second embodiment of a storage container particularly suitable for the invention, and FIG. 6 shows a section through the container shown in FIG. 5 along the line C—D.

DESCRIPTION OF THE PREFERRED EMBODIMENTS

Figures 1, 2:
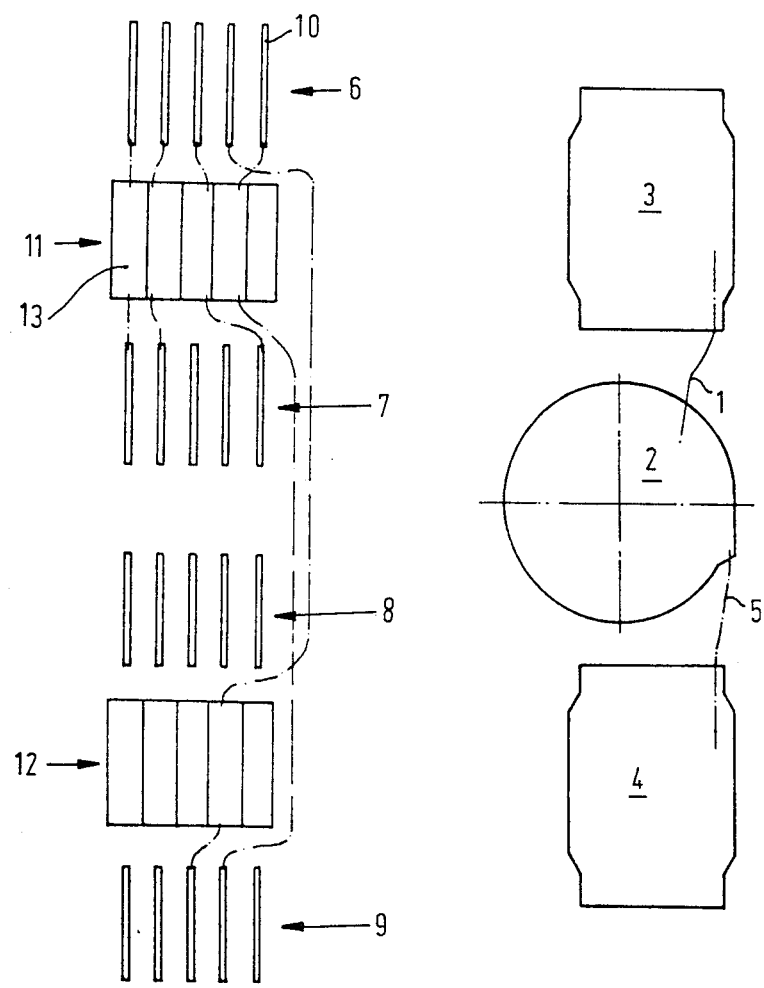
FIG. 1 diagramatically shows the connection of two light conducting fibres made using the method according to the invention.
FIG. 2 is a schematic representation of various connections made in accordance with the invention in a distributor station.

In FIG. 1 the storage container for a connecting fibre with the ends 1 and 5 is designated 2. Fibres with a strong secondary coating and having an outer diameter of approx. 0.9. mm are particularly suitable as connecting fibres. Housings 3 and 4 are used for the take-up of spliced connections each with a light conducting fibre of a first cable or a second cable. The length of the connecting fibre has to be chosen in accordance with the distances of housings 3 and 4 from each other. In the majority of cases occurring in practice it is sufficient if at both sides of the storage container, two lengths 1 and 5 of 0.5 m each can be pulled out, in which case the total length of the connecting fibre including the turn remaining inside is about 2 m. To make the splices, ends 1 and 5 are pulled out and, after storage of the splices in housings 3 and 4, pushed back again.

Of course, plug and socket connections could also be chosen instead of splices, in which case ends 1 and 5 would be provided with plug and socket connectors.

FIG. 2 shows four groups 6, 7, 8 and 9 of light conducting fibres 10 each of which, for example, belongs to optical cables which are led into a distributor housing. By means of groups, 11 and 12, each consisting of five stacked storage containers 13, from each of which both ends of a connecting fibre can be pulled as explained with reference to FIG. 1, connections of all light waveguides can be completed or subsequently changed in various ways, some of which are indicated by dash-dot lines.

FIGS. 3 and 4, and also 5 and 6, show storage containers which are specially adapted for the process according to the invention. It is a matter here, on the one hand, of housing great lengths of connecting fibre in containers taking up the least possible space and, on the other, of having end sections which can be pulled out and pushed in frequently and easily without giving rise to faults. Furthermore, a minimum permissible bending radius for light conducting fibres must be respected also for the turns of the connecting fibres inside the storage containers. That is why the connecting fibres 14 and 15 are wound in a plane in several turns, of which for greater clarity only three are shown, round a core 16 or 17, whose diameter is approx. 60 mm, so that even if the innermost turn is in close contact with the core, the minimum permissible bending radius is still respected.

The cores 16 and 17 each connect centrally a rear guide wall 18 or 19 and front guide walls which are designed as narrow radial spokes 20 and 21 and are each interrupted by lead-in slots 22 and 23 running obliquely to the tangent of the turns, through which slots the turns of connecting fibres 14 and 15 can be inserted. The oblique orientation of the slots 22 and 23 prevents the turns from sliding back out when such is not intended.

The guide walls on both sides enclose a winding space of (small) height h, which is slightly greater than the diameter of the connecting fibre and should not exceed approx. 1.3 times its diameter. Smooth, regular and intersection-free laying-in of the turns is thus ensured.

It is an advantage if the ends 24 and 25 leading from the radially outermost turn protrude through openings 26 and 27 in the preferably cylindrically arranged side walls 28 and 29. The side walls can, however, for example, also take the form of a square, in which case the outermost turns rest on four points.

If end 30 of connecting fibre 14 leading from the innermost turn is led, as shown in FIG. 3, freely over the outer turns between its contact with the core 16 and the guide eyelet 40, it is possible, under certain circumstances, for jamming of the first turn with the one after it to occur if the ends 24 and 30 are pulled out forcibly and completely but this can be easily cleared again since the winding space is easily accessible through the large open spaces between the radial spokes 20.

If two or more storage containers are to be stacked on top of one another as in FIG. 2, the embodiment shown in FIGS. 5 and 6 is to be recommended. The end 31 of the connecting fibre 15 leading from the inner winding is led as far as a point 32 through a guide duct which extends in the guide wall 19 from the side wall 29 to the periperal surface of the core 17, and is then bent round into the plane of the turns obliquely or in a gentle S-shaped curve inside a suitable channel 33 in the core 17. Any friction between the end 31 and the turns of the connecting fibre 25 in the winding space is thus prevented.

The connecting fibres 24 and 25 are normally laid in such a way that approximately the same lengths can be pulled out at both sides. The ends can be pulled out or pushed in particularly easily if both are moved simultaneously. If different lengths are required at the two ends, and particularly if only one end is too short for a connecting point located somewhat further away, the latter can be pulled out further if the other end is pushed in simultaneously or alternately bit by bit.

Optimum utilisation of the winding space in terms of the maximum length of connecting fibre which can be pulled out, results if the number of turns n is approximately $$n = k \cdot \frac{D - d}{d_o},$$

with $k = 0.25$. In this expression d is the diameter of the core and D is the diameter of the side walls 28 and 29 or the maximum possible diameter of the outermost turn; $d_o$ is the diameter of the connecting fiber. Usable results are also obtained if k is chosen between 0.2 and 0.3. $(0.2 < k < 0.3)$.

If the values $d_o$ and d and the length L of the connecting fibre are given, the value D should be chosen approximately as follows:

$$D = d + \sqrt{\frac{8 d_o \cdot L}{\pi}}$$

With this dimensioning, the smallest possible dimensions are obtained.

What is claimed is:

1. A storage container for receiving a detachable connecting fibre, both ends of said connecting fibre being connectable with an optical line, comprising a substantially cylindrical core having a diameter of at least 40 mm, arranged centrally between two lateral guide walls the distance h between the guide walls being in the range $d_o < h < 1.3$, where $d_o$ is the diameter of the connecting fibre, the connecting fibre being wound spirally in at least two turns in a plane around the core, the end of the outermost turn being detachable through an opening in a side wall surrounding the core at a distance, and the end of the innermost turn being detachable and being led obliquely from the winding space between the lateral guide walls and over the turns to a guide eyelet located radially outside the winding space.

2. A storage container as claimed in claim 1, characterized in that the end of the innermost turn is led, on its path to a point at least approximately in contact with the surface of the core, through a guide duct in an area outside the winding space.

3. A storage container as claimed in claim 2, characterized in that, at least over a predetermined angular range, in which it is substantially concentric with the core, the guide duct runs obliquely with respect to the guide walls, while the guide duct is led over the turns and outside the space occupied by the turns in a plane that is parallel to and preferably between the guide walls.

4. A storage container as claimed in claims 1, 2 or 3, characterized in that at least one of the lateral guide walls consists of at least three spaced, spoke-shaped radial beams.

5. A storage container as claimed in claim 4, characterized in that the beams are interrupted in their central area by lead-in slots running obliquely to the tangent of the turns.

6. A storage container as claimed in claims 1, 2 or 3, characterized in that the number n of the turns is $n = k \frac{D-d}{d}$, where $0.2 < k < 0.3$ preferably with $k = 0.25$,
D = the maximum diameter of the outermost turn,
d = the diameter of the core and
$d_o$ = the diameter of the connecting fibre.

* * * * *